United States Patent
Hirano et al.

(12)

(10) Patent No.: US 6,267,480 B1
(45) Date of Patent: Jul. 31, 2001

(54) SIDE-VIEW MIRRORS

(75) Inventors: Yoshihisa Hirano; Kyozo Omi, both of Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 09/547,675

(22) Filed: Apr. 12, 2000

(30) Foreign Application Priority Data

Apr. 30, 1999 (JP) .................................................. 11-124094

(51) Int. Cl.⁷ ..................................................... G02B 7/182
(52) U.S. Cl. ............................. 359/871; 359/872; 359/877
(58) Field of Search ..................................... 359/871, 872, 359/877; 248/476, 484, 485

(56) References Cited

U.S. PATENT DOCUMENTS 4,792,220 * 12/1988 Janowicz ............................... 359/877
4,857,885 * 8/1989 Umerez ................................. 340/321
6,019,475 * 2/2000 Lynam et al. ......................... 359/879

* cited by examiner

Primary Examiner—Mohammad Sikder
(74) Attorney, Agent, or Firm—Nixon Peabody LLP; Thomas W. Cole

(57) ABSTRACT

Side-view mirrors are provided in which, without adversely, affecting operations of retracting side-view mirrors and adjusting mirror surfaces, mechanisms are greatly simplified and a waterproofing/dustproofing mechanism can be omitted, thereby resulting in much lower manufacturing costs. In a switching driving section of the control device which adjusts the mirror surfaces of a pair of left-side and right-side side-view mirrors, a motor is selectively meshed with gears or gears by a switching operation by a plunger. The mirror surfaces of the side-view mirrors can thereby be adjusted to an arbitrary mounting angle. Namely, driving mechanisms provided for each of a left-side and a right-side as in conventional structures are combined into the single switching driving section, and thus the manufacturing costs are greatly reduced.

8 Claims, 1 Drawing Sheet

SIDE-VIEW MIRRORS

BACKGROUND OF THE INVENTION

1. Field of the Invention

The present invention relates to side-view mirrors having a control device which can adjust the reflective surfaces of or retract side-view mirrors used in a vehicle, construction equipment, or the like.

2. Description of the Related Art

In vehicles, construction equipment, agricultural equipment, and the like, a side-view mirror is provided at the exterior of the vehicle at each of the right and left sides of the vehicle in order for the driver to be able to confirm the rearward field of vision while driving. Further, side-view mirrors are known which are of the type that an electric remote-controlled adjustment mechanism is housed therein, in order to maintain the mirror surface of the side-view mirror at an angle of reflection which is optimal for the driver. In such side-view mirrors, usually, an electric retracting mechanism, for improving the ability to park the vehicle, is also housed in within the side-view mirror. (An example of such a structure is disclosed in Japanese Patent Application Laid-Open (JP-A) No. 10-278676.)

Such a side-view mirror which incorporates an electric remote-controlled adjustment mechanism has, at the interior of each of the left-side and right-side mirrors, plural motors for adjusting the mirror surface (e.g., two motors at each of the left-side and right-side mirrors) and a motor for retracting the mirror (e.g., one motor at each of the left-side and right-side mirrors). Thus, the side-view mirrors are expensive to manufacture. Further, because the adjusting mechanism is disposed within the mirror, i.e., at the exterior of the vehicle, it must have a waterproofing mechanism and a dustproofing mechanism to protect against rain, clouds of dust, or the like. For this reason as well, the side-view mirrors are expensive to manufacture.

SUMMARY OF THE INVENTION

In view of the aforementioned, an object of the present invention is to provide side-view mirrors in which, without adversely affecting the operations of retracting the mirrors and adjusting the mirror surfaces, mechanisms are greatly simplified and a waterproofing/dustproofing mechanism can be omitted, thereby resulting in much lower manufacturing costs.

A first aspect of the present invention is a pair of left-side and right-side side-view mirrors for a vehicle, comprising: mirror surfaces; mirror visors covering the mirror surfaces; and a control device by which the mirror surfaces are adjustable, the control device comprising: connecting members connected independently to the pair of left-side and right-side side-view mirrors, said connecting members subjecting the side-view mirrors to a mirror surface adjustment operation by transferring to the side-view mirrors driving force which is applied to said connecting members; a switching driving section having a drive source, and switchable between a state in which one connecting member of said connecting members is independently connected to the drive source and a state in which another connecting member of said connecting members is independently connected to the drive source, and applying driving force to the connecting member which is connected to the drive source; and an operation portion for carrying out driving and a switching operation of the drive source of said switching driving section.

In the side-view mirrors of the first aspect of the present invention, connecting members are connected independently to a pair of left-side and right-side side-view mirrors, and the connecting members can be connected independently to a drive source. Namely, the switching driving section can be switched between a state of independently connecting the drive source to one of the connecting members and a state of independently connecting the drive source to the other of the connecting members. Accordingly, the connecting member to which the drive source is connected transfers the driving force of the drive source, and the mirror surface of the side-view mirror is moved and adjusted by this driving force.

In this way, in the side-view mirrors of the first aspect, the driving mechanism for moving and adjusting the mirror surface, which was provided at each of the left-side and right-side side-view mirrors in conventional structures, is unified into a single switching driving section. Thus, the manufacturing cost can be greatly reduced.

The switching driving section is connected to the side-view mirrors via the connecting members. Thus, the switching driving section can be installed within the vehicle compartment. Accordingly, there is no need to provide a special mechanism for waterproofing or dustproofing against rain or clouds of sand. For this reason as well, the manufacturing cost is reduced.

If the switching driving section, which corresponds to the mechanism group which was provided at the height of the driver's shoulders in conventional devices, is structured so as to be able to be placed, for example, near the feet of the driver, the effects of the sound of operation of the drive source and the like can be reduced, which contributes to the comfort of the driver.

In addition, the present invention does not differ from conventional devices with regard to operational performance of the mirror surface adjustment which is carried out by the driver, and thus, the same level of convenience can be ensured.

In this way, in the side-view mirrors of the first aspect, without adversely affecting the operation of mirror surface adjustment of the side-view mirrors by the driver, the mechanism can be greatly simplified and a waterproofing/dustproofing mechanism can be omitted. Thus, manufacturing costs can be greatly reduced.

A second aspect of the present invention is a pair of left-side and right-side side-view mirrors for a vehicle, comprising: mirror surfaces; mirror visors covering the mirror surfaces; mirror stays supporting the mirror visors; and a control device by which the side-view mirrors are retractable, the control device comprising: connecting members connected to the pair of left-side and right-side side-view mirrors, said connecting members subjecting the side-view mirrors to a retracting operation by transferring to the side-view mirrors driving force which is applied to said connecting members; a single drive source which applies a driving force to said connecting members by being connected to said connecting members; and an operation portion which carries out an operation for driving of said drive source.

In the side-view mirrors of the second aspect, driving force from the drive source is transmitted by the connecting members connected to the left-side and right-side pair of side-view mirrors, and the side-view mirrors are retracted by the driving force.

Here, there is no need to retract the pair of side-view mirrors separately. In the side-view mirrors of the second aspect, the left-side and right-side side-view mirrors can be retracted by a single drive source. Thus, the mechanism is simplified, and the costs are reduced.

The single drive source is connected to the side-view mirrors via the connecting members. Thus, the drive source can be disposed within the vehicle compartment. Accordingly, a special mechanism for waterproofing or dustproofing against rain and clouds of dust can be omitted, and the manufacturing cost can thereby be reduced.

If the drive source, which corresponds to the mechanism group which was provided at the height of the driver's shoulders in conventional devices, is structured so as to be able to be placed, for example, near the feet of the driver, the effects of the sound of operation of the drive source and the like can be reduced, which contributes to the comfort of the driver.

In addition, the present invention does not differ from conventional devices with regard to the operational performance of retracting which is carried out by the driver, and thus, the same level of convenience can be ensured.

In this way, in the side-view mirrors of the second aspect, without adversely affecting the operation of retraction of the side-view mirrors by the driver, the mechanism can be greatly simplified and a waterproofing/dustproofing mechanism can be omitted. Thus, manufacturing costs can be greatly reduced.

DESCRIPTION OF THE PREFERRED EMBODIMENTS

Figure 1:
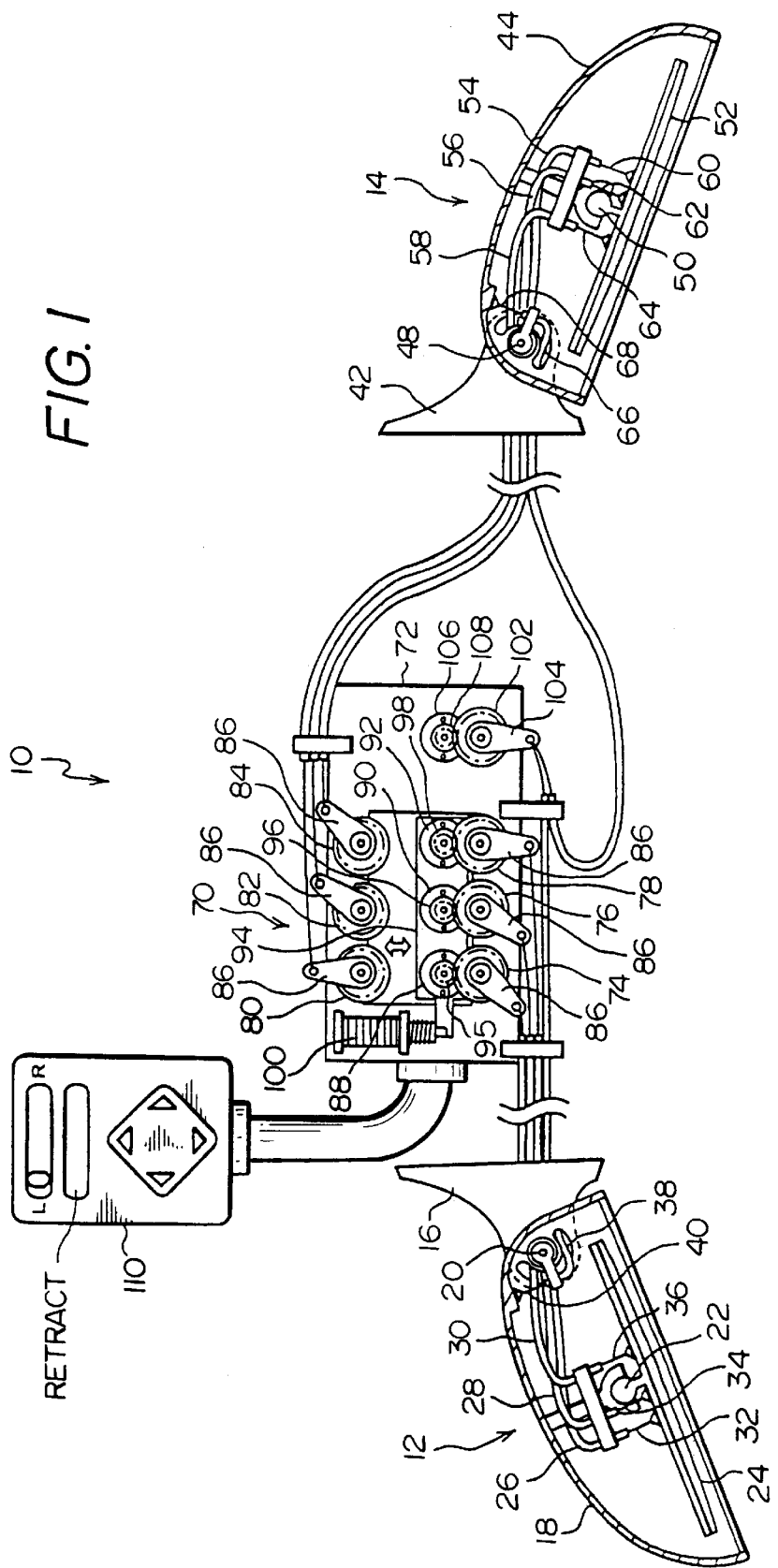
FIG. 1 is a cross-sectional view illustrating the overall structure of a control device for side-view mirrors relating to an embodiment of the present invention.

The overall structure of a control device 10 for side-view mirrors relating to an embodiment of the present invention is illustrated in FIG. 1.

The control device 10 is applied to a pair of right-side and left-side side-view mirrors 12, 14. The pair of side-view mirrors 12, 14 are structured substantially the same, and first, the one side-view mirror 12 will be described. The side-view mirror 12 is structured such that a mirror visor 18 is supported at a mirror stay 16 so as to be retractable by a hinge 20. A mirror surface 24 is supported so as to be movable horizontally and vertically and so as to be freely pivotable, by a universal joint 22 provided at the mirror visor 18.

Three coaxial wires 26, 28, 30, which form one set, are connected to the side-view mirror 12. Respective inner wires 32, 34, 36 of these three coaxial wires 26, 28, 30 are connected to the mirror surface 24. By pulling the inner wires 32, 34, 36, the mirror surface 24 can be adjusted to an arbitrary angle in the horizontal direction and the vertical direction.

A coaxial wire 38 is connected to the hinge 20 portion of the side-view mirror 12. The outer sheath tube portion of the coaxial wire 38 is fixed integrally to the mirror stay 16. An inner wire 40 of the coaxial wire 38 is connected to the mirror visor 18. In this way, by pulling the inner wire 40, the mirror visor 18 can be pivoted around the hinge 20 so as to be retracted.

Similarly to the side-view mirror 12, the other side-view mirror 14 is structured such that a mirror visor 44 is supported at a mirror stay 42 so as to be retractable by a hinge 48. A mirror surface 52 is supported so as to be movable horizontally and vertically and so as to be freely pivotable, by a universal joint 50 provided at the mirror visor 44.

Three coaxial wires 54, 56, 58, which form one set, are connected to the side-view mirror 14. Respective inner wires 60, 62, 64 of these three coaxial wires 54, 56, 58 are connected to the mirror surface 52. By pulling the inner wires 60, 62, 64, the mirror surface 52 can be adjusted to an arbitrary angle in the horizontal direction and the vertical direction.

A coaxial wire 66 is connected to the hinge 48 portion of the side-view mirror 14. The outer sheath tube portion of the coaxial wire 66 is fixed integrally to the mirror stay 42. An inner wire 68 of the coaxial wire 66 is connected to the mirror visor 44. In this way, by pulling the inner wire 68, the mirror visor 44 can be pivoted around the hinge 48 so as to be retracted.

The control device 10 is provided with a switching driving section 70. At the switching driving section 70, three sets of pairs of gears 74, 76, 78 and gears 80, 82, 84 are disposed within a housing 72. An arm 86 is provided at each of the gears 74, 76, 78. The inner wires 32, 34, 36 of the coaxial wires 26, 28, 30 connected to the one side-view mirror 12 are connected to the arms 86. Therefore, due to the rotation of the respective gears 74, 76, 78, the inner wires 32, 34, 36 are pulled, and the mirror surface 24 of the side-view mirror 12 is pivoted in the horizontal direction or in the vertical direction so as to be moved and adjusted to an arbitrary angle.

Similarly, the arm 86 is provided at each of the other gears 80, 82, 84. The inner wires 60, 62, 64 of the coaxial wires 54, 56, 58 connected to the other side-view mirror 14 are connected to the arms 86. Therefore, due to the rotation of the respective gears 80, 82, 84, the inner wires 60, 62, 64 are pulled, and the mirror surface 52 of the side-view mirror 14 is pivoted in the horizontal direction or in the vertical direction so as to be moved and adjusted to an arbitrary angle.

Three motors 88, 90, 92 serving as drive sources are disposed between the gears 74, 76, 78 and the gears 80, 82, 84 in the housing 72 of the switching driving section 70. Each motor 88, 90, 92 is mounted to a sliding stand 94. The sliding stand 94 is positioned between the gears 74, 76, 78 and the gears 80, 82, 84, and is slidably supported at the housing 72, so as to be slidable between the gears 74, 76, 78 and the gears 80, 82, 84. Thus, by sliding the sliding stand 94, pinions 95, 96, 98 provided at the output shafts of the motors 88, 90, 92 approach and mesh with the gears 74, 76, 78 or the gears 80, 82, 84. Accordingly, in the state in which the pinions 95, 96, 98 of the motors 88, 90, 92 are meshed with either the gears 74, 76, 78 or the gears 80, 82, 84, the driving force of the motors 88, 90, 92 is transmitted to either the coaxial wires 26, 28, 30 (the inner wires 32, 34, 46) or the coaxial wires 54, 56, 58 (inner wires 60, 62, 64). The mirror surface 24 of the side-view mirror 12 or the mirror surface 52 of the side-view mirror 14 can thereby be pivoted either in the horizontal direction or in the vertical direction, and moved and adjusted to an arbitrary angle.

A plunger 100 forming a switching mechanism is provided at the housing 72 of the switching driving section 70. The plunger 100 is connected to the sliding stand 94, and by being operated on and off, moves the sliding stand 94 so that the pinions 95, 96, 98 of the motors 88, 90, 92 can mesh with either the gears 74, 76, 78 or the gears 80, 82, 84.

Further, a gear 102 is provided at the housing 72 of the switching driving section 70. The inner wire 40 of the coaxial wire 38 connected to the side-view mirror 12 and the inner wire 68 of the coaxial wire 66 connected to the side-view mirror 14 are connected to an arm 104 of the gear 102. A motor 106 is provided in the vicinity of the gear 102. A pinion 108 provided at the output shaft of the motor 106 always meshes with the gear 102. Thus, by rotating the motor 106, the inner wires 40, 68 are pulled so as to retract the side-view mirror 12 and the side-view mirror 14.

The respective motors 88, 90, 92, 106 and the plunger 100 are connected to a mirror control switch 110, and can be controlled by the operation of the driver.

Operation of the present embodiment will be described hereinafter.

In the control device 10 of the side-view mirrors 12, 14 structured as described above, the side-view mirrors 12, 14 are independently connected to the coaxial wires 26, 28, 30 or the coaxial wires 54, 56, 58. Further, the coaxial wires 26, 28, 30 or the coaxial wires 54, 56, 58 are independently connected to motors 88, 90, 92. Namely, the switching driving section 70 can be switched between a state in which the coaxial wires 26, 28, 30 are independently connected to the motors 88, 90, 92, and a state in which the coaxial wires 54, 56, 58 are independently connected to the motors 88, 90, 92.

Accordingly, when the mirror surface of the side-view mirror 12 or the side-view mirror 14 is to be adjusted, by operating the mirror control switch 110, the plunger 100 is driven, the slider stand 94 is moved with the motors 88, 90, 92, and the pinions 94, 96, 98 mesh with either the gears 74, 76, 78 or the gears 80, 82, 84. In this way, the coaxial wires 26, 28, 30 or the coaxial wires 54, 56, 58 which are connected to the motors 88, 90, 92 transfer driving power of the motors 88, 90, 92, and the mirror surface of the side-view mirror 12 or the side-view mirror 14 is moved and adjusted.

On the other hand, when the side-view mirror 12 or the side-view mirror 14 is to be retracted, the motor 106 is operated by operating the mirror control switch 110. In this way, the coaxial wires 38, 66 transmit the driving force of the motor 106, and the side-view mirror 12 or the side-view mirror 14 is retracted by this driving force.

In this case, it is not necessary to retract the pair of side-view mirrors 12, 14 separately. Further, the pinion 108 of the motor 106 always meshes with the gear 102. In other words, the motor 106 is always connected to the side-view mirrors 12, 14 via the coaxial wires 38, 66. Thus, the pair of side-view mirrors 12, 14 can be simultaneously retracted by a single motor 106 without using a special switching mechanism. Accordingly, the mechanism is simplified, and costs can be reduced even more.

In this way, in the control device 10 of the side-view mirrors 12, 14 relating to the present embodiment, the driving mechanism for carrying out the mirror surface adjusting operation and the retracting operation, which was provided at each of the left and right sides in conventional devices, is integrated as the single switching driving section 70. Thus, the manufacturing cost can be reduced greatly.

The switching driving section 70 is connected to the side-view mirror 12 or the side-view mirror 14 via the coaxial wires 26, 28, 30 or the coaxial wires 54, 56, 58. Therefore, it is possible to place the switching driving section 70 within the vehicle compartment. Accordingly, a special mechanism for waterproofing and dustproofing against rain, clouds of dust or the like, can be omitted, and for this reason as well, the manufacturing cost can be reduced.

Further, if the switching driving section 70, which corresponds to the mechanism group which was provided at the height of the driver's shoulders in conventional devices, is structured so as to be able to be placed, for example, near the feet of the driver, the effects of the operating sound of the motors 90, 92, 106 and the like can be reduced, which contributes to the comfort of the driver.

In addition, the present invention does not differ from conventional devices with regard to the operational performances of mirror surface adjustment and retracting which are carried out by the driver, and thus, the same level of convenience can be ensured.

In this way, in the control device 10 of the side-view mirrors 12, 14 relating to the present embodiment, without adversely affecting operations such as mirror surface adjustment and retraction of the side-view mirror 12 or the side-view mirror 14 by the driver, the mechanism can be greatly simplified and a waterproofing/dustproofing mechanism can be omitted, such that the manufacturing costs can be greatly reduced.

In the present embodiment, the single motor 106 is connected to both side-view mirrors 12,14, and retracts the side-view mirrors 12, 14 simultaneously. However, the present invention is not limited to the same. Similarly to the motors 88, 90, 92, gears can be mounted to the sliding stand 94 in correspondence with the left-side and right-side side-view mirrors 12, 14, and the gears can be connected selectively to one of the side-view mirrors 12, 14 by moving the sliding stand 94.

In the above-described present embodiment, the driving force of the motors 88, 90, 92 is transmitted to the side-view mirror 12 or 14 by the coaxial wires 26, 28, 30 or the coaxial wires 54, 56, 58. However, the present invention is not limited to the same. For example, the driving force of the motors 88, 90, 92 may be transmitted to the side-view mirrors 12,14 by a link mechanism formed from rods and joints, a hydraulic mechanism formed from pressure pipes, a gear mechanism formed from a plurality of gears, or the like.

In the present embodiment, the plunger 100 is used as the mechanism for switching the driving force of the motors 88, 90, 92. However, the present invention is not limited to the same, and a switching mechanism using a friction disc may be used.

In the present embodiment, the present invention is applied to the side-view mirrors 12, 14 of a vehicle. However, the present invention is not limited to the same, and may be applied to, for example, construction equipment, agricultural equipment, and the like.

As described above, side-view mirrors relating to the present invention, without adversely affecting operations such as mirror surface adjustment and retraction of the side-view mirrors by the driver, the mechanism can be greatly simplified and a waterproofing/dustproofing mechanism can be omitted, such that the manufacturing costs can be greatly reduced.

What is claimed is:

1. A pair of left-side and right-side side-view mirrors for a vehicle, comprising:
   mirror surfaces;
   mirror visors covering the mirror surfaces; and
   a control device by which the mirror surfaces are adjustable, the control device including:
   connecting members connected independently to the pair of left-side and right-side side-view mirrors, said connecting members subjecting the side-view mirrors to a mirror surface adjustment operation by transferring to the side-view mirrors a mechanical driving force which is applied to said connecting members;

a switching driving section disposed outside of said mirror visors and having a drive source, and switchable between a state in which one connecting member of said connecting members is independently connected to the drive source and a state in which another connecting member of said connecting members is independently connected to the drive source, and applying mechanical driving force to the connecting member which is connected to the drive source; and an operation for carrying out driving and a switching operation of the drive source of said switching driving section.

2. The side-view mirrors of claim 1, wherein said drive source is movable between a position at which the drive source is connected to one connecting member and a position at which the drive source is connected to another connecting member.

3. The side-view mirrors of claim 2, wherein said switching driving section switches the drive source between the position at which the drive source is connected to the one connecting member and the position at which the drive source is connected to the other connecting member, by the switching operation of said operation portion.

4. The side-view mirrors of claim 1, wherein said connecting members are coaxial wires, the coaxial wires have outer sheath tube portions and inner wires, the outer sheath tube portions are fixed to the mirror visors, and the inner wires are connected to the mirror surfaces.

5. The side-view mirrors of claim 4, wherein driving force from the drive source is transferred, by the inner wire of one connecting member connected to the drive source, to the side-view mirror to which the one connecting member is connected.

6. The side-view mirrors of claim 5, wherein the mirror surface adjustment operation is carried out by pulling the inner wire by driving force from the drive source.

7. The side-view mirrors device of claim 1, wherein a switching mechanism at said switching driving section is a plunger.

8. The side-view mirrors of claim 1, wherein at said switching driving section, driving force is applied from the drive source to said connecting member by meshing of a pinion provided at the drive source and a gear connected to said connecting member.

\* \* \* \* \*